United States Patent [19]

Hoag, Jr. et al.

[11] 3,902,878
[45] Sept. 2, 1975

[54] METHOD AND APPARATUS FOR PRODUCING FIBERS AND ENVIRONMENTAL CONTROL THEREFOR

[75] Inventors: Harry J. Hoag, Jr., San Jose; Alvis M. Rawlinson, Campbell, both of Calif.

[73] Assignee: Owens-Corning Fiberglas Corporation, Toledo, Ohio

[22] Filed: May 21, 1971

[21] Appl. No.: 145,665

[52] U.S. Cl. ................................. 65/3; 65/6; 65/14; 117/126 GR; 118/73; 118/420
[51] Int. Cl. ............................................. C03b 37/00
[58] Field of Search ............ 118/73, 420; 65/3, 5, 2, 65/6, 14, 16; 117/126 GR

[56] References Cited
UNITED STATES PATENTS

| 3,021,563 | 2/1962 | Slayter et al. | 65/3 |
| 3,179,507 | 4/1965 | Levecque et al. | 65/6 X |
| 3,347,648 | 10/1967 | Krakauer et al. | 65/3 |
| 3,546,898 | 12/1970 | Langlois et al. | 65/2 |

*Primary Examiner*—Robert L. Lindsay, Jr.
*Attorney, Agent, or Firm*—Carl G. Staelin; John W. Overman; Harry O. Ernsberger

[57] ABSTRACT

The disclosure embraces a method of and arrangement for effecting environmental control of the fiber-attenuating or fiberizing zone in a fiber-forming process wherein centrifuged bodies of heat-softened material are engaged by a high velocity gaseous blast attenuating the bodies to fibers and a vaporizable medium applied or delivered to the fiberizing zone and onto the fibers for cooling the fibers and binder applied to the cooled fibers with a minimum of volatilization of binder constituents avoiding contamination of the atmosphere and effecting substantial savings of binder.

9 Claims, 14 Drawing Figures

PATENTED SEP 2 1975
3,902,878
SHEET 1 OF 4
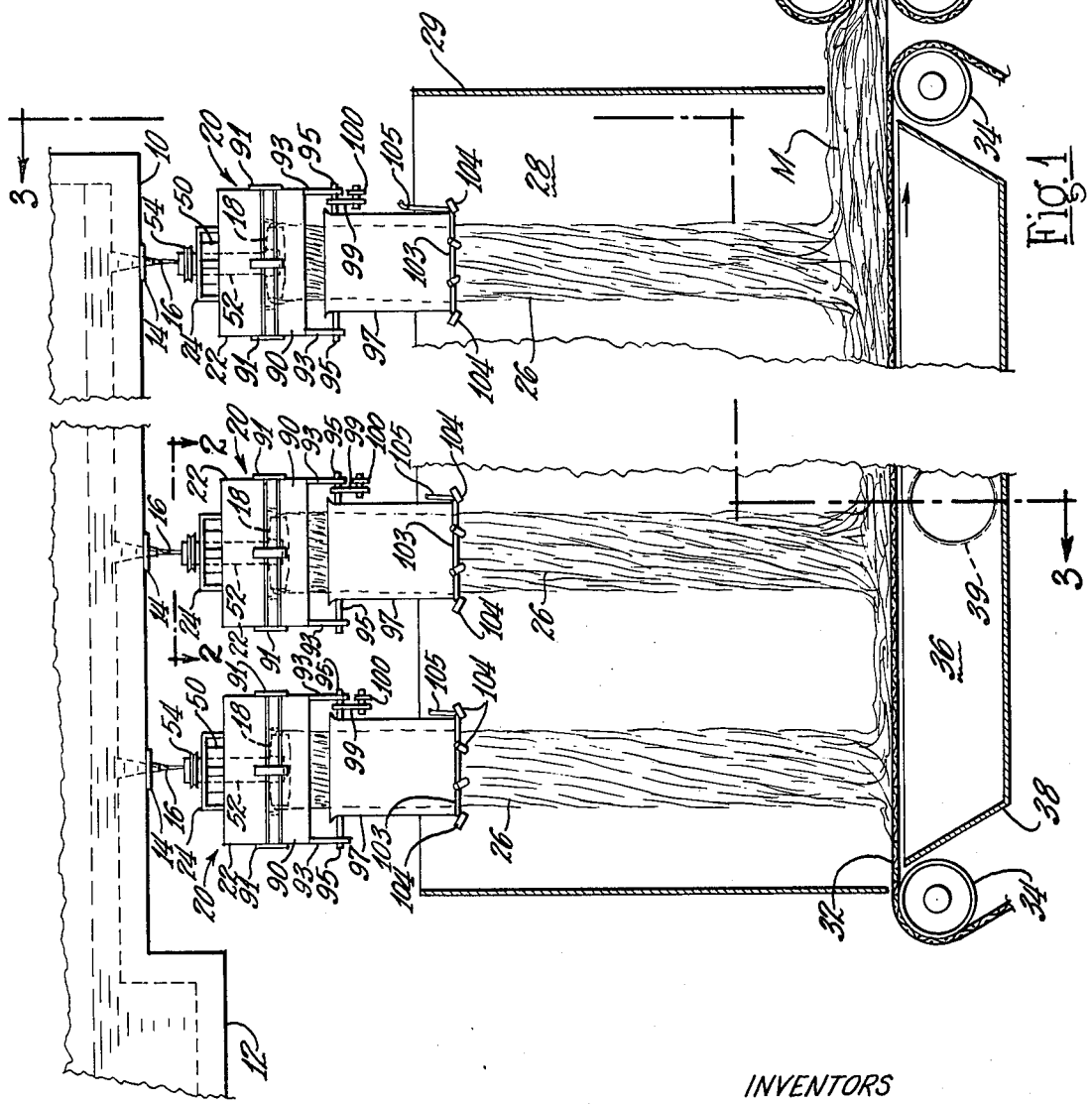
INVENTORS
HARRY J. HOAG, JR. &
ALVIS M. RAWLINSON
BY
*Staelin & Overman*
ATTORNEYS

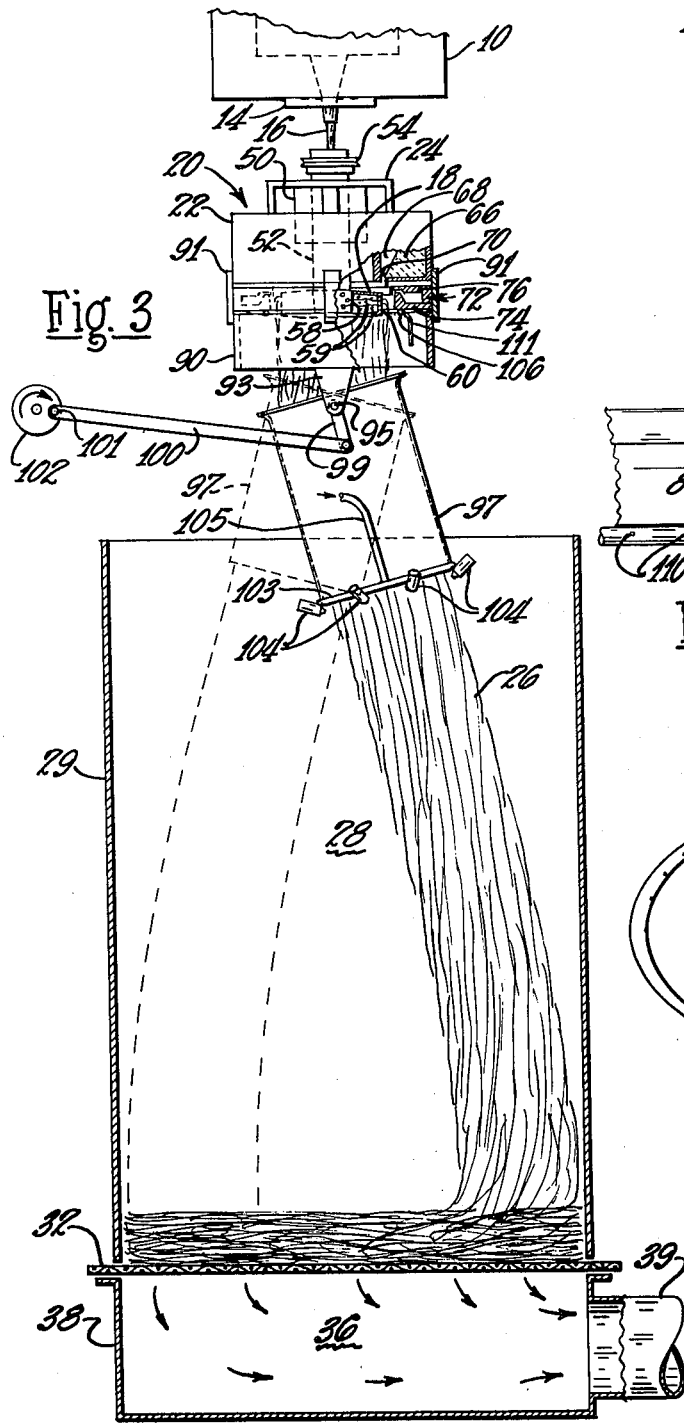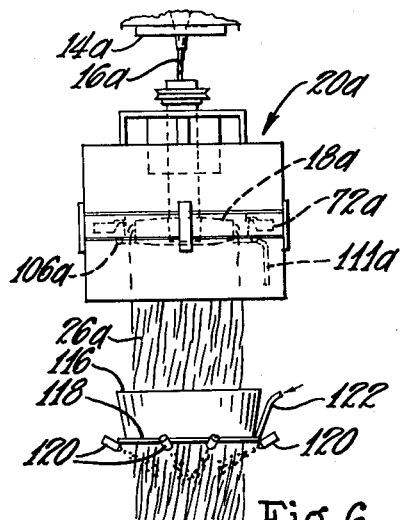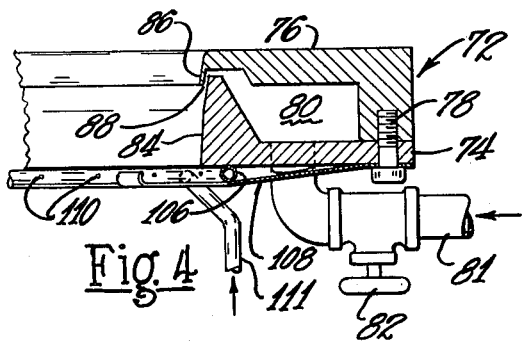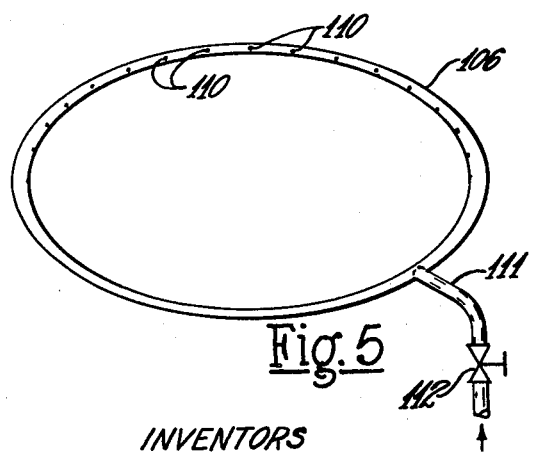
INVENTORS
HARRY J. HOAG, JR. &
ALVIS M. RAWLINSON
BY
Staelin & Overman
ATTORNEYS

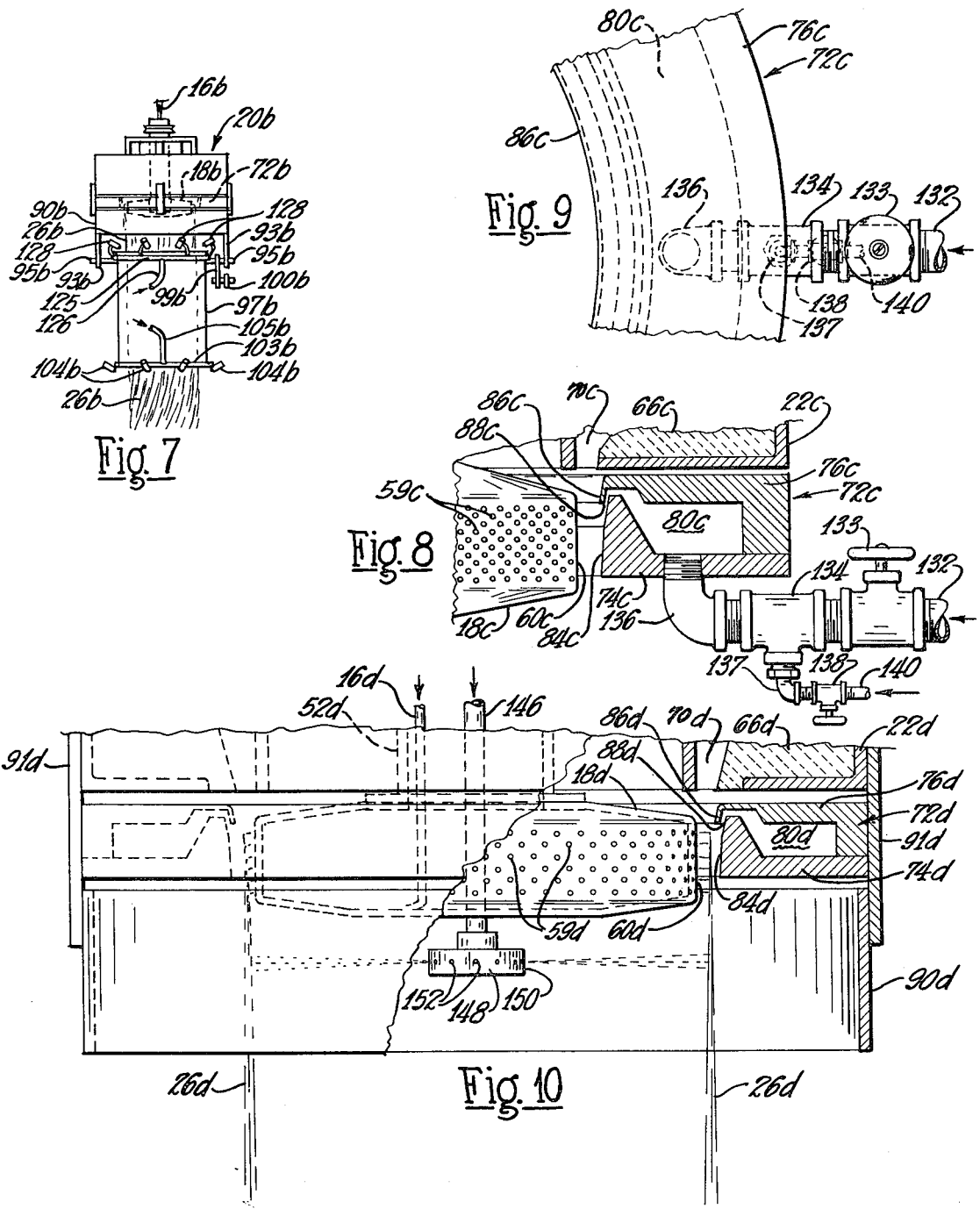

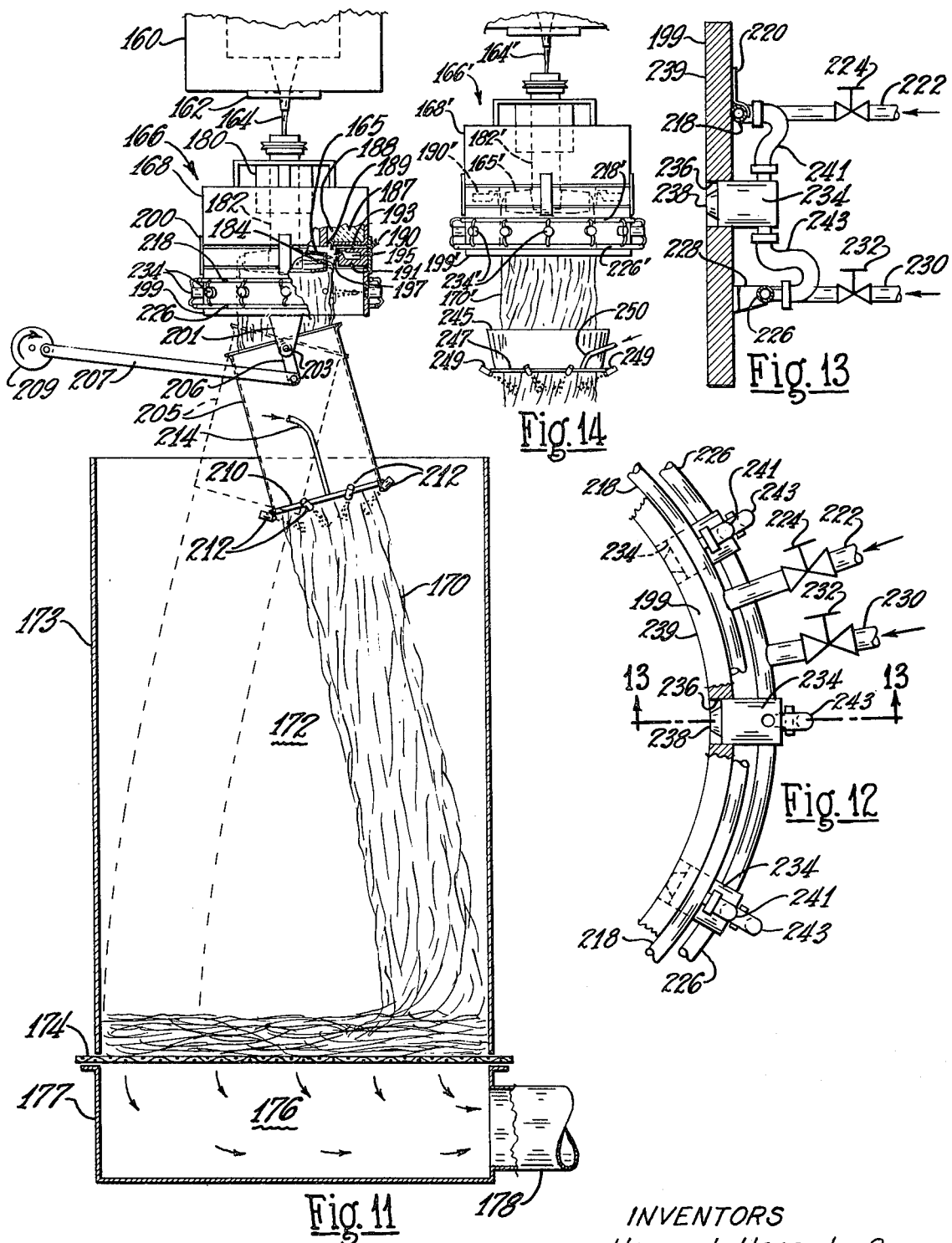

METHOD AND APPARATUS FOR PRODUCING FIBERS AND ENVIRONMENTAL CONTROL THEREFOR

It has been conventional practice in forming fibers of glass or other heat-softenable materials by a rotary process to deliver heat-softened or molten glass into a hollow spinner or centrifuge provided with a comparatively large number of orifices in the peripheral wall of the spinner and, by high speed rotation of the spinner, the softened or molten glass is delivered through the orifices by centrifugal forces providing bodies, streams or primary filaments of glass which are engaged by an annularly-shaped gaseous blast and thereby attenuated into fibers which are entrained in the blast in the form of a hollow beam or column of fibers.

In the fiber-forming operation it has been a usual practice to deliver or apply an uncured binder, such as phenolformaldehyde in solution form, to the newly attenuated fibers at a region below the attenuating region so that the fibers are thoroughly coated with the uncured binder. Fibers of this character are collected in a mass upon a moving conveyor, the mass sized as to thickness providing a fibrous mat which is conveyed or passed through an oven or curing zone for setting the binder in the mat.

In such method the descending fibers at the region of application of the binder are at a temperature of 500°F. to 600°F. or more even though the zone of application of the binder onto the fibers is substantially below the attenuating region. At such temperatures of the fibers, excessive volatilization of the organic chemicals in the binder occurs and there is a tendency for the binder to be partially polymerized or cured and some of the solvent vaporized and the vapor and binder particulates or solids discharged into the atmosphere through the suction blower arrangement beneath the region of collection of the fibers on the conveyor.

The vaporized solvent and the organic particulates or binder solids delivered into the atmosphere are visually evident in the form of a dense chemical plume or cloud-like formation at the region of effluence from the discharge stack. This system has resulted in substantial wastes of binder solvent and solids or particulates as well as promoting contamination of the atmosphere by reason of the effluence of particulates from the stack.

The method of the invention involves the provision of environmental control at the fiberizing region in a process for forming fibers, involving engaging centrifuged streams of heat-softened material by an annular gaseous blast, to effect substantial reduction in the temperature of the fibers, cooling the fibers to a temperature at which binder may be applied minimizing the volatilization and loss of binder constituents, substantially reducing discharge of organic particulates into the atmosphere effecting savings of binder and providing improved distribution of the binder throughout the mass of attenuated fibers.

An object of the invention, in a process for forming fibers wherein centrifuged streams of heat-softened material are attenuated to fibers by a gaseous blast, embraces the application or delivery of a vaporizable medium into the attenuating or fiberizing zone to cool the fibers to a temperature at which an organic binder may be delivered onto the fibers so as to minimize the volatilization of binder constituents and thereby effectively reducing the discharge of vapor and organic particulates into the atmosphere thus reducing contamination.

Another object of the invention resides in a method of forming fibers of glass by engaging centrifuged streams or primary filaments of glass by an annular blast to attenuate the streams or primary filaments to fibers and wherein a heat-absorbing vaporizable liquid is delivered onto the high temperature fibers at the fiberizing zone and evaporating substantially all of the applied liquid by the heat from the fibers and the fiberizing environment to cool the fibers so that there is no appreciable wetting of the fibers or residue of the liquid on the fibers at the region of application of binder onto the cooled fibers.

Another object of the invention resides in an arrangement of centrifuging heat-softened material into streams or primary filaments engaged by an annular gaseous blast to attenuate the streams or primary filaments to fibers, the arrangement including means for delivering or applying a vaporizable medium into the attenuating environment onto the newly attenuated high temperature fibers to cool the fibers so that binder may be delivered onto the cooled fibers with a minimum of volatilization of the binder constituents thereby reducing the discharge of volatiles and particulates into the atmosphere.

Another object of the invention resides in a method of and arrangement for processing fibers formed by engaging an annular gaseous blast with centrifuged glass streams or primary filaments attenuating the streams or filaments to fibers wherein a vaporizable liquid in fine particle form is delivered onto the high temperature fibers to promote rapid transfer of heat from the fibers to the liquid to evaporate substantially all of the liquid delivered onto the fibers and to thereby reduce the temperature of the fibers at a binder applying region to reduce or substantially eliminate presetting or precuring of the binder at the zone of binder application and reduce binder losses.

Further objects and advantages are within the scope of this invention such as relate to the arrangement, method of operation and function of the relative elements, to various details of construction and to combinations of parts, elements per se, and to economies of manufacture and numerous other features as will be apppparent from a consideration of the specification and drawing of a form of the invention, which may be preferred, in which:

FIG. 1 is a side elevational view of a plurality of fiber forming units and fiber distributing means, and a collecting arrangement for the fibers shown in cross section;

FIG. 2 is a sectional view taken substantially on the line 2—2 of FIG. 1 illustrating a driving means for a spinner of a fiber forming unit;

FIG. 3 is a transverse sectional view of the arrangement shown in FIG. 1, illustrating one arrangement for carrying out the method of the invention and distributing the attenuated fibers, the view being taken substantially on the line 3—3 of FIG. 1;

FIG. 4 is an enlarged fragmentary sectional view of a portion of the arrangement shown in FIG. 3;

FIG. 5 is a view of the vaporizable-medium delivery means shown in FIGS. 3 and 4;

FIG. 6 is a view illustrating a modified form of an arrangement for delivering binder onto the attenuated fibers;

FIG. 7 is an elevational view illustrating a modified method and arrangement for cooling the attenuated fibers in advance of the application of binder to the fibers;

FIG. 8 is an enlarged fragmentary detail sectional view of blast-producing blower illustrating a modified method of delivering a vaporizable liquid onto the fibers to cool the fibers;

FIG. 9 is a top plan view of a portion of the construction shown in FIG. 8;

FIG. 10 is a fragmentary elevational view, partly in section, illustrating a modified arrangement for delivering a vaporizable liquid onto fibers to cool the fibers;

FIG. 11 is an elevational view, partly in section, illustrating a modification of the method and arrangement for delivering a vaporizable liquid onto fibers to cool the fibers;

FIG. 12 is an enlarged fragmentary plan view of a portion of the construction illustrated in FIG. 11;

FIG. 13 is a sectional view taken substantially on the line 13—13 of FIG. 12, and FIG. 14 is an elevational view illustrating a modification of the binder applying arrangement.

While the method and apparatus of the invention are illustrated with fiber-forming units wherein streams of primary filaments of heat-softened material, such as glass, are centrifuged from a spinner and engaged by a gaseous blast attenuating the streams or primary filaments to fibers, it is to be understood that the method may be used with other forms of fiber attenuating apparatus and for forming fibers or other heat-softenable materials, such as argillaceous rock, slag and the like.

The apparatus of the invention is illustrated in association with fiber-forming units wherein heat-softened material delivered into hollow rotors or spinners is centrifuged into elongated bodies, primary filaments or fine streams which are engaged by annular gaseous blasts concentric with the spinners for attenuating the bodies, primary filaments or streams to fibers and binder applied to the attenuated fibers in advance of the region of collection of the fibers.

With reference initially to FIGS. 1 and 3, there is illustrated a portion of a forehearth 10 which receives heat-softened glass or other flowable fiber-forming material from a melting furnace 12 of conventional character wherein raw material or batch is reduced to a heat-softened flowable or molten state. Arranged lengthwise of the forehearth 10 in spaced relation are feeders 14, each feeder provided with an orifice through which a stream 16 of glass flows into a hollow rotor or spinner 18 of a fiber-forming unit 20. It is to be understood that any number of fiber-forming units 20 may be employed with the forehearth depending upon the size or thickness or density of the mass or mat of fibers desired.

The fiber-forming units 20 are supported beneath the forehearth 10 upon a suitable frame construction (not shown) of conventional character. Each of the fiber-forming units is inclusive of a circular housing 22 mounted upon a bracket or member 24, the latter being mounted by the frame construction (not shown). The blast-attenuated fibers 26 from each of the fiber-forming units are delivered into a chamber or forming hood 28 provided by a walled enclosure 29. Binder is applied to the fibers in a manner and at a region hereinafter described.

Arranged at the base or open bottom of the walled enclosure 29 is the upper flight of a foraminous or reticulated endless belt conveyor 32 on which the fibers from the several fiber-forming units are collected in a mass M. The conveyor is supported by a plurality of rolls 34, two of which are shown in FIG. 1, one of the conveyor supporting rolls being driven by a motor and conventional speed reducing means (not shown) to advance the upper flight of the conveyor in a right-hand direction as viewed in FIG. 1.

Disposed beneath the upper flight of the conveyor 32 in registration with the chamber 28 is a suction chamber 36 defined by a thin-walled receptacle 38, the chamber 36 being connected by a pipe 39 with a suction blower (not shown) of conventional construction for establishing subatmospheric or reduced pressure in the chamber 36. The reduced pressure or suction existent in the chamber 36 assists in the collection of fibers 26 upon the conveyor, the spent gases of the attenuating blast and vapor and organic particulates from the binder being conveyed away through a pipe 39 to a vent stack (not shown) and discharged into the atmosphere.

The mass M of fibers is advanced to a region between upper and lower foraminous belts or conveyors 42 and 44 which are disposed to compress the fibers into a mat or fibrous body 46 of desired thickness. The foraminous belts 42 and 44 convey the mat 46 of fibers through an oven or curing chamber 48 for setting or curing the binder on the fibers by the application of heat in the chamber 48 in a well known manner. During the binder curing or setting step, the mat of fibers is maintained under compression by the belts 42 and 44 so that upon curing of the binder the fibers are bonded into mat formation.

Each of the fiber-forming units 20 is inclusive of a housing 50 in which is journally supported a tubular member or quill 52, the spinner or rotor 18 being mounted upon the lower end of the quill as shown in FIG. 3. The upper end of the quill is equipped with a sheave 54 driven by a belt 55 connected with a sheave 56 driven by a motor 57, as shown in FIG. 2, to rotate the quill and spinner 18. The glass of each stream 16 flows through the quill 52 into a glass distributor 58 which may be a cup-like member in the spinner with perforations in its peripheral wall through which streams of glass are delivered by contrifugal forces into engagement with the inner surface of a peripheral wall 60 of the spinner 18.

The molten glass at the spinner wall 60 is delivered through a plurality of orifices or openings 59 in the spinner wall 60 to form elongated bodies, streams or primary filaments of glass by centrifugal forces of rotation of the spinner. Each fiber-forming unit is inclusive of a combustion burner arrangement providing a heated environment at the region of the periphery of the spinner and the bodies, streams or primary filaments, and a blower means for delivering an annular high velocity gaseous blast for attenuating the bodies, streams or primary filaments to fibers.

Disposed with the circular housing 22 of each fiber-forming unit is a combustion burner construction 66 fashioned with an annular combustion chamber 68 in which combustible mixture of fuel and air is burned and the hot gases of combustion delivered through an annular throat 70 downwardly along the exterior surface of the peripheral wall 60 of the spinner to maintain the bodies, primary filaments or streams of glass in a softened condition suitable for attenuation.

Disposed adjacent and below the combustion burner construction 66 is a blower 72 for providing an annular high velocity gaseous attenuating blast. The blower construction, shown in FIGS. 3 and 4, is inclusive of an annular body 74 having an annular cover member 76 secured by suitable means, such as bolts 78, to the body 74, one of which is illustrated in FIG. 4. A gas, such as compressed air or steam, may be employed as a fiber-attenuating blast. The body and cover members define an annular blower manifold or chamber 80 supplied with compressed air or steam from a supply through a pipe 81, a valve 82 regulating the flow of compressed air or steam into the manifold 80.

The body 74 is fashioned with a skirt or surface 84, and the cover member 76 fashioned with a depending circular flange 86. The upper portion of the blower skirt surface 84 adjacent the flange 86 is provided with a plurality of spaced circumferentially arranged slots 88 through which the compressed air or steam is delivered in a downward direction as an annular high velocity blast into engagement with the primary filaments or streams of glass projected from the spinner 18. The downwardly directed annular gaseous blast attenuates the primary filaments or streams to fine fibers of varying lengths, the fibers moving downwardly in a tubular veil orientation or formation. A circular guard member or slug guard 90 is mounted by brackets 91 depending from the housing 22.

In the arrangement illustrated in FIGS. 1 and 3, means is provided for distributing or oscillating the group or veil of fibers from each attenuating unit transversely of the conveyor 32 whereby the fibers of a group are lapped upon themselves and fibers from the other units during collection of fibers on the conveyor. Depending from the guard or member 90 is a pair of brackets 93. Pivotally supported upon pins or stub shafts 95 journaled in openings in the brackets 93 is a tubular fiber distributing member or lapper 97 of generally cylindrical shape of a diameter to embrace or surround the tubular group of fibers 26 moving downwardly from a fiber-forming unit.

The pins 95 are securely fastened to the lapper 97. The member or lapper 97 is arranged to be oscillated about its pivotal support. The lapper oscillating means illustrated is inclusive of an arm or member 99 fixedly attached to one of the stub shafts or pins 95, the lower end of member 99 being pivotally connected to a link 100. The link is pivotally connected as at 101 to a crank member 102 driven by a motor (not shown) through suitable speed reducing mechanism for oscillating the lapper. FIG. 3 illustrates, in broken lines, th extent of angular movement of the lapper 97 in the operation of distributing the fibers transversely of the conveyor.

While one form of means for oscillating the lapper 97 is illustrated in FIGS. 1 and 3, it is to be understood that other suitable means may be employed for the purpose. The lapper member 97, as illustrated in FIGS. 1 and 3, is of substantial length. The lower end region of the cylindrically-shaped lapper 97 supports a circular manifold 103 equipped with a plurality of binder applicators or nozzles 104 circumferentially spaced as shown in FIGS. 1 and 3. A flexible binder conveying tube 105 is connected with the manifold 103 and a supply of binder (not shown) for conveying binder to the manifold 103 for delivery from the nozzles 104.

The elongated bodies, primary filaments or streams of glass delivered by centrifugal forces from the spinner are at attenuating temperatures usually in a range of from 1600°F. to 2000°F. depending upon the character and composition of the glass and the characteristics and velocity of the blast employed for attenuating the bodies, primary filaments or streams to fibers as well as the size of attenuated fibers desired. While the attenuated fibers lose heat as they move downwardly from a fiber-forming unit, the temperature of the fibers has heretofore been in the neighborhood of 500°F. to 600°F. or more in the region of the application of the binder onto the fibers.

Binders such as phenolformaldehyde and other similar resinous binders are applied in liquid solution onto the fibers. At such temperatures of the fibers, there is excessive volatilization of the solvent and organic chemicals in the binder composition. The volatiles and particulates of binder entrained in the gases of the blast were drawn into the suction chamber 36 and discharged through the vent stack above the building containing the fiber-forming units, the discharged solvent and organic particulates of the binder contaminating the atmosphere.

A substantial percentage of the binder solids and the vaporized solvent was lost into the atmosphere as waste. The discharged material was evidenced by a chemical plume or cloud-like formation in the vicinity of the discharge vent. The vapors delivered from the vent stack condense forming the visible plume of liquid droplets similar to water vapor condensation which forms a visible steam plume.

The condensed organic vapor forming the organic plume has a low vapor pressure and does not readily evaporate into the ambient atmosphere but persists after the droplets in the plume are re-evaporated. The primary factor in fiber-forming operations heretofore carried on which creates the visible organic plume is the 500°F. to 600°F. fiber temperature environment at the point of application of the binder.

The present invention provides a method and arrangement for cooling the fibers to an extent that at the region of application of the binder, the temperature of the fibers is substantially reduced below a value at which volatilization of the constituents and discharge of organic particulates of the binder is greatly reduced or substantially eliminated. The cooling of the fibers is accomplished by applying a heatabsorbing vaporizable medium into or adjacent the fiber attenuating or fiberizing zone and onto the intensely hot fibers to effect vaporization of the medium by the transfer of heat from the fibers and from the fiberizing environment and without appreciable wetting of the fibers.

It is found expedient to apply or deliver the vaporizable medium in an amount such that the applied medium will be substantially completely volatilized so that little or no moisture remains on the cooled fibers. It is found that water delivered in the form of fine particle sprays provides an effective vaporizable medium for rapidly reducing the temperature of or cooling the fibers.

The fiber cooling or heat transfer system should have the capacity to effect the evaporation or volatilization of substantially the same amount of water regardless of the solids constituent of the binder applied to the fibers so as to maintain a constant low level of the residual moisture of the binder solvent in the mass of fibers. It is found that it requires more time in curing the binder to remove water from high solid droplets of the binder which increase in viscosity more rapidly as the water is being removed.

In contrast the rate evaporation of the water applied for cooling the fibers by heat absorption utilizing a pure water spray is virtually constant and is substantially uneffected by the diffusion of water through the organic materials contained in the binder droplets. It is therefore desirable for most effective cooling of fibers and proper binder application to adjust the amount of cooling water delivered onto the fibers so that no residue of cooling water remains on the cooled fibers and to adjust the binder solids to maintain the rate of application of the binder solution onto the cooled fibers substantially constant.

In the arrangement illustrated in FIGS. 3, 4 and 5, an annularly-shaped tube 106 is mounted beneath the body 74 of the blower 72, the tube being secured in position by retaining members or brackets 108 secured in position by the bolts 78, one of which is shown in FIG. 4. The tube is positioned beneath the blower body 74 and is of a diameter slightly greater than the diameter of the blower skirt surface 84 so that the tube is spaced away from the blower surface 84 in the manner illustrated in FIG. 4.

The inner peripheral region of the tube 106 is provided with a plurality of small orifices, openings or jets 110 for directing water or other vaporizable medium onto the fibers at the fiber attenuating or fiberizing region just beneath the blower body. A supply conduit or tube 111 conveys water from a water supply under substantial pressure into the tube 106 and fine sprays of water delivered from the nozzles or orifices 110 onto the fibers. A valve 112 or other control means is provided for regulating the rate of flow of water to the annular tube or tubular ring 106.

Where the throughput of glass varies for particular fiber forming installations, the amount of water delivered onto the fibers from the annular tube 106 may be varied by modifying the diameter of size of the openings 110 or by varying the number of openings or orifices in the tube 106. The determining factor as to the amount of water delivered per unit of time onto the fibers is the environmental temperature at the fiber forming region of the unit. The amount of water should be sufficient to result in evaporation of substantially all of the water delivered onto the fibers for cooling them with as little residue of moisture on the fibers as possible.

It is found that an excess of cooling water is detrimental as it accelerates fiber build-up on the lapper member 97 and hence it is important to accurately regulate the amount of water per unit of time delivered onto the fibers for cooling the fibers. The water may be treated to reduce water salt build-up on the lapper member 97, but it is found that less difficulty is encountered in this respect when deionized water is used. It is found that for most rotary fiber-forming units in forming glass fibers that the amount of water delivered into the fiber-forming zone of each fiber-forming unit is within a range of from ¼ gallon per minute to 1½ gallons per minute for satisfactory fiber cooling.

It is found that the temperature at the region of binder application is usually in a range between 175°F. and 300°F. which is below a temperature at which there is substantial volatilization of the binder composition. There is attained through the method of the invention a substantial reduction in volatilization of the binder solvent and in the discharge of vapor and binder particulates from the vent stack especially evidenced by the absence of a visible plume at the stack.

Thus the invention promotes a substantial reduction in localized contamination of the atmosphere by volatilized binder solution and organic particulates as well as effecting substantial savings in the amount of binder as more binder is retained on the fibers. By cooling the fibers with a minimum of water residue on the cooled fibers, presetting or precuring of the binder on the fibers at the region of binder application is substantially eliminated and, in the absence of substantial residue of moisture on the cooled fibers no additional heat is required in the operation of curing the binder in the curing oven.

Another factor bearing upon the efficiency of cooling the fibers resides in the size of the water droplets or particles delivered into the fiberizing zone and onto the fibers. While vaporization of the water on the fibers is accelerated through the use of very finely atomized water droplets, it is found that if the water particles or droplets are too fine they bounce or rebound from the fibers into the cylindrical lapper 97 aggravating fiber build-up in the lapper. If the size of the water droplets or particles delivered into the fiberizing zone are too large, then there is partial or incomplete vaporization of the water and this condition results in wet fiber build-up in the lapper.

Hence, control of the size of the water particles delivered onto the fibers is desirable in order to attain most efficient cooling of the fibers without excessive water residue remaining on the fibers and to reduce fiber build-up in the lapper.

FIG. 6 illustrates a rotary fiber-forming unit 20a of the same character as the fiber-forming unit shown in FIGS. 1 and 3. The stream of glass 16a from a feeder 14a falls by gravity into a spinner 18a. Surrounding the spinner is a blower construction 72a for delivering a high velocity gaseous blast into engagement with the streams or primary filaments of glass centrifuged from the spinner for attenuating the streams or primary filaments into fibers 26a as hereinbefore described in connection with the arrangement shown in FIGS. 1 and 3.

Disposed adjacent and beneath the blower construction 72a is a circular tube 106a of the character shown in FIG. 5, a tube 111a being connected with the circular tube 106a for supplying a vaporizable medium, such as water, to the circular tube. The circular tube 106a is fashioned on its inner periphery with orifices, such as those shown at 110 in FIG. 5, for directing the vaporizable medium onto the fibers at the fiberizing or fiber attenuating zone to cool the fibers.

In the arrangement shown in FIG. 6, the fibers entrained in the blast move downwardly in substantially vertical directions onto a collector or conveyor but are not distributed transversely by a lapper member. As shown in FIG. 6, a frusto-conically shaped member 116 surrounds the descending group of fibers 26a, the member 116 being supported in a stationary position by suitable means (not shown). The lower edge of the member 116 supports a circular hollow manifold 118 equipped with a plurality of circumferentially spaced means or nozzles 120 for directing binder composition onto the fibers 26a of the group.

Binder from a supply is delivered to the manifold 118 through a tube 112. The region of application of the binder onto the fibers is spaced beneath the spinner a distance whereby heat from the fibers vaporizes or evaporates the water or other vaporizable cooling medium so that the temperature of the fibers at the binder applying zone is reduced so that there is a minimum of volatilization of the binder on the fibers and to avoid precuring or presetting of the binder in the fibers.

The member 116 is preferably frusto-conically shaped so as to facilitate entry of the fibers into the region embraced by the member 116. The fibers 26a of the group or veil are collected in the manner illustrated in FIG. 3 but without transverse distribution or lapping of the group of fibers on the fiber collecting conveyor. With this arrangement a minimum of volatiles and organic particulates of the binder are delivered into the vent stack and ambient atmosphere.

FIG. 7 illustrates a fiber-forming unit in association with a modified arrangement for delivering a vaporizable medium, such as water, onto the fibers to cool the fibers. The fiber-forming unit 20b is substantially the same as the fiber-forming unit 20 shown in FIGS. 1 and 3. A stream of molten glass 16b is delivered into a rotating spinner 18b having a peripheral wall provided with a large number of orifices through which molten glass from the interior of the spinner is projected to form fine streams of glass or primary filaments, the filaments or streams being engaged by a high velocity gaseous blast from a blower 72b for attenuating the primary filaments or fine streams of glass to fibers 26b.

The arrangement includes a thin-walled circular member 90b providing a slug guard. Depending from the member 90b are brackets 93b having openings accommodating stub shafts 95b secured to a cylindrically-shaped tubular member or lapper 97b of the character shown at 97 in FIG. 3 which is oscillated for distributing and lapping the veil or group of fibers transversely in the manner illustrated in FIG. 3. An arm 99b secured to one of the stub shafts 95b is actuated by a reciprocating link 100b to oscillate the member 97b in the manner hereinbefore described in connection with the arrangement shown in FIGS. 1 and 3.

Secured to an upper region of the member or lapper 97b is a circular manifold 125 which is supplied with water or other vaporizable medium under pressure through a supply tube 126. A plurality of circumferentially spaced nozzles 128 are supported by the manifold 125, the nozzles receiving water from the manifold deliver sprays of water onto the fibers to cool the fibers. A circular manifold 103b is disposed at the lower end of the member or lapper 97b, the manifold 103b supporting a plurality of circumferentially-spaced binder applying nozzles 104b for delivering binder onto the cooled fibers at the lower end region of the member 97b.

The manifold 103b is connected with a supply of binder, such as a water solution of phenolformaldehyde, conveyed from the supply to the manifold 103b through a flexible tube 105b. The fibers, at the region of application of the binder from the nozzles 104b, are at a substantially reduced temperature so that there is no appreciable volatilization of the binder composition delivered onto the cooled fibers. The fibers bearing the binder may be collected on a conveyor in the manner illustrated in FIGS. 1 and 3.

FIGS. 8 and 9 illustrate a modified method and arrangement for delivering a vaporizable medium, such as water, onto the fibers at the attenuating or fiberizing zone to cool the fibers. In this form, compressed air is utilized as a high velocity attenuating blast, the water or other vaporizable medium being delivered into the blower and conveyed onto the fibers by the air blast. The blower construction 72c is disposed beneath the circular housing 22c, an annular combustion burner 66c being disposed within the housing 22c.

The burner has an annular discharge throat 70c through which intensely hot gases of combustion provided by a burning fuel and air mixture in the chamber of the burner are delivered along the peripheral wall 60c of the spinner 18c. The spinner is carried by a quill in the manner illustrated in FIGS. 1 and 3 and is rotatable about a vertical axis. The peripheral wall of the spinner 18c is provided with a large number of small openings or orifices 59c through which streams of glass or primary filaments are projected by centrifugal forces into the attenuating blast.

The blower 72c is inclusive of a body 74c and a cover member 76c, the cover having a depending circular flange 86c spaced from the blower skirt 84c. A plurality of circumferentially spaced slots 88c provide a region through which compressed air in the blower chamber 80c is delivered as a high velocity into engagement with the primary filaments or fine streams of glass centrifuged through the orifices 59c, the blast attenuating the primary filaments or streams to fibers of varying lengths.

The fibers may be delivered through an oscillating tube or lapper, such as the tube 97 shown in FIGS. 1 and 3, or the fibers may be delivered through a stationary frusto-conically shaped member, such as the member 116, illustrated in FIG. 6. An arrangement is provided for delivering compressed air and a regulated amount of vaporizable medium, such as water, into the blower chamber 80c for delivery of the water by the air blast onto the fibers to cool the fibers.

A pipe 132 is connected with a supply of compressed air. The pipe is connected with an adjustable valve 133 and the valve connected with a Tee or fitting 134, the Tee being connected by an L-shaped fitting 136 with the blower chamber 80c. By regulating the adjustable valve 133, the amount of compressed air delivered into the blower chamber for the attenuating blast may be regulated or controlled. A side branch of the Tee 134 is connected by a fitting 137 with an adjustable valve 138 and the valve is connected by a pipe 140 with a supply of water or other vaporizable medium under pressure.

Through this arrangement, the water under pressure is delivered into the compressed air and the water entrained in the air is distributed in the blower chamber 80c and delivered by the air blast through the blower slots 88c and onto the fibers attenuated by the blast from the primary filaments or streams delivered from the spinner 18c. The rate of delivery of water into the blower chamber 80c and onto the fibers is regulated by adjusting the valve 138. The rate of delivery of water onto the fibers is controlled so that substantially all of the water delivered onto the fibers for cooling the fibers is evaporated or volatilized by the heat from the fibers and the heat at the fiberizing zone.

An oscillating tube or lapper may be disposed beneath the blower and spinner to receive the fibers in the manner illustrated in FIG. 3, and binder applied to the cooled fibers by binder applicators or nozzles, such as those shown at 104 in FIG. 3, or binder applied from nozzles supported by a stationary member, such as member 116, illustrated in FIG. 6. The fibers may be collected upon a foraminous conveyor belt of the character shown in FIG. 3 at the region of a suction chamber of the character illustrated at 36 in FIG. 3.

FIG. 10 illustrates a modified arrangement for delivering water or other vaporizable medium onto fibers for cooling the fibers. In this form the spinner or rotor 18d is carried by the lower end of the quill or tubular member 52d which is mounted for rotation about a vertical axis. A stream 16d of glass, offset from the axis of the spinner 18d, is delivered through the quill 52d into the hollow spinner in contact with the floor of the spinner and the glass conveyed to the peripheral wall 60d of the spinner by centrifugal forces. The peripheral wall 60d of the spinner is fashioned with a large number of orifices or openings 59d through which fine streams or primary filaments of molten glass are projected by centrifugal forces.

A blower construction 72d is disposed beneath the circular housing 22d, an annular combustion burner 66d being disposed within the housing 22d, the burner having an annular discharge throat 70d through which intensely hot combustion gases provided by burning fuel and air mixture in the burner are delivered along the exterior peripheral wall 60d of the spinner 18d. The blower 72d is inclusive of a body 74d and a cover member 76d, the cover having a depending circular flange 86d spaced from the blower skirt 84d.

A plurality of circumferentially-spaced slots 88d provide a region through which compressed air or steam in the blower chamber 80d is delivered as a high velocity blast into engagement with the primary filaments or fine streams of glass centrifuged through the orifices 59d in the peripheral wall of the rotating spinner, the gaseous blast attenuating the primary filaments or streams to fibers of varying lengths. The fibers may be delivered through an oscillating tube or lapper, such as the tube 97 shown in FIGS. 1 and 3, or the fibers may be delivered through a stationary frusto-conically shaped member such as the member 116 illustrated in FIG. 6.

In this form of the invention, the water or other vaporizable medium for cooling the fibers is delivered through the spinner 18d onto the fibers at a region adjacent and downwardly of the peripheral spinner wall. A tube 146 extends downwardly through the quill 52d and through the spinner and is equipped at its end with a distributor or applicator 148. The distributor 148 may be fashioned with a peripheral wall 150 provided with a plurality of circumferentially-spaced orifices or nozzles 152.

Water or other vaporizable medium is delivered under pressure from a supply through the pipe or tube 146 to the distributor 148 and the water projected through the orifices or nozzles 152 is sprayed in small particles onto the fibers 26d, small or fine water particles being readily vaporized by heat from the fibers thereby cooling the fibers.

If desired, the tube 146 and the water distributor 148 may be mounted for rotation and the water in the distributor 148 delivered outwardly onto the fibers by centrifugal forces. In such arrangement, the rotatable tube 146 is coupled with a water supply tube through a conventional rotatable seal construction. As in the other forms of the invention, the binder is applied onto the fibers adjacent the end of a lapper tube such as a tube 97 shown in FIGS. 1 and 3, or the binder nozzles mounted on a stationary member, such as the member 116, illustrated in FIG. 6. A circular slug guard 90d may be provided supported by brackets 91d from the housing 64d.

In the several forms of the invention, water is preferably used as the vaporizable medium for cooling of the fibers for economic reasons and because of the high heat absorption characteristic of water in effecting rapid transfer of heat away from the fibers. Other vaporizable media may be used, however, such as liquid carbon dioxide, liquid air, liquid nitrogen and fine particles of solid carbon dioxide.

Water or other vaporizable medium may be delivered in atomized condition by air under pressure and supplied onto the fibers by suitable nozzles arranged circumferentially of the fiber attenuating or fiberizing zone. FIGS. 11 through 13 illustrate an arrangement of this character for cooling the fibers. A forehearth 160 receives heat-softened glass or other heat-softened fiber-forming material from a melting furnace of conventional character. A feeder 162 for each fiber-forming unit has an orifice through which a stream 164 flows into a hollow rotor or spinner 165 of a fiber-forming unit 166.

The fiber-forming unit includes a housing 168 mounted by a frame construction (not shown). The blast-attenuated fibers 170 from the fiber-forming unit 166 are delivered into a chamber 172 provided by a walled enclosure 173. Arranged at the open bottom of the enclosure 173 is the upper flight of a movable foraminous endless belt conveyor 174 on which the fibers are collected in a mass.

Disposed beneath the upper flight of the conveyor in registration with the chamber 172 is a suction chamber 176 provided by a thin-walled receptacle 177, the chamber 176 being connected by a pipe 178 with a suction blower (not shown) of conventional construction for establishing subatmospheric pressure or suction in the chamber 176. The reduced pressure existant in the chamber 176 assists in the collection of fibers 170 upon the conveyor, and the spent gases of the blast are conveyed away through the pipe 178 to a vent stack (not shown) and discharged into the atmosphere.

The fibers on the conveyor 174 may be compressed to form a mat or fibrous body which is advanced through an oven or curing chamber of conventional character, shown in FIG. 1, for setting or curing the binder on the fibers by the application of heat. The fiber-forming unit is inclusive of a housing 180 in which is journally supported a tubular member or quill 182, the spinner 165 being mounted upon the lower end of the quill.

The quill is driven by a motor in the manner shown in FIG. 2. The glass of the stream 164 flows through the quill 182 into the spinner 165 and is projected by centrifugal force into engagement with the inner surface of a peripheral wall 184 of the spinner 165. The molten glass at the spinner wall 184 is delivered through orifices or openings in the spinner wall 184 to form fine glass streams or primary filaments under the influence of centrifugal forces of rotation of the spinner.

The circular housing 168 encloses a combustion burner construction 187 having an annular combustion chamber 188 in which a combustible mixture of fuel and air is burned and the hot gases of combustion delivered through an annular throat 189 and downwardly along the exterior surface of the peripheral wall of the spinner to maintain the primary filaments or streams of glass in a softened condition.

Disposed adjacent and below the combustion burner construction 187 is a blower 190 for providing an annular high velocity gaseous fiber attenuating blast, the blower construction being of the character shown in FIGS. 3 and 4 and is inclusive of an annular body 191 having an annular cover member 193, the body and cover members defining an annular manifold 195 which is supplied with compressed air or steam from a supply provided to regulate the flow of compressed air or steam into the manifold 195.

The body and cover member are shaped to provide circumferentially arranged blower slots 197 through which the compressed air or steam is delivered as an annular high velocity blast into engagement with the primary filaments or fine steams of glass projected from the spinner 165, the blast attenuating the primary filaments or streams to fibers. A circular member or slug guard 199 is mounted by brackets 200 dependent from the housing 168.

Depending from the member 199 are a pair of brackets 201. Pivotally supported upon stub shafts 203 journaled in openings in the brackets 201 is a tubular fiber-distributing member or lapper 205 of generally cylindrical shape disposed to embrace or surround the tubular group or veil of fibers 170 moving downwardly from the fiber-forming unit. The member or lapper 205 is arranged to be oscillated about its pivotal support. The lapper oscillating means includes an arm or member 206 fixedly attached to one of the stub shafts 203, the member 206 being pivotally connected to a link 207.

The link is pivotally connected with a crankdisc or member 209 driven by a motor (not shown) through suitable speed reducing mechanism for oscillating the lapper. The lapper member 205 is of substantial length. The lower end region of the cylindrically-shaped lapper member 205 supports a manifold 210 equipped with a plurality of circumferentially-spaced binder applicators or nozzles 212. A flexible binder supply tube 214 is connected with the manifold 210 and a supply of binder (not shown), the tube 214 conveying binder to the manifold 210 for delivery from the nozzles 212.

The temperatures of the fibers at the attenuating or fiberizing zone are usually in a range of from 1600°F. to 2000°F. The arrangement shown in FIGS. 11 through 13 for cooling the fibers is associated with the circular member or slug guard 199. In this arrangement the vaporizable medium, such as water, is delivered to one circular manifold adjacent the slug guard and a second circular manifold adjacent the slug guard is supplied with compressed air or other gas and sprays of water atomized by air or gas streams are delivered into the fiberizing zone and onto the fibers for cooling the fibers.

Disposed adjacent and exteriorly of the circular member or slug guard 199 is a first circular manifold 218 connected with a water supply under pressure. The manifold 218 is supported by circumferentially-spaced brackets 220 secured to the member 199, one of the brackets being illustrated in FIG. 13. A water supply pipe 222 is connected with a water supply for conveying water to the manifold 218, an adjustable valve means 224 associated with the water supply pipe 222 is provided for regulating flow of water to the manifold 218.

A second circular manifold 226 surrounds the circular member 199 and is supported by brackets 228 secured to the member 199, one of the brackets being illustrated in FIG. 13. It is to be understood that other suitable means may be utilized for mounting the manifolds adjacent the circular member 199. A pipe 230 supplies compressed air from a supply to the manifold 226, an adjustable valve 232 being associated with the pipe 230 for regulating flow of compressed air to the manifold 226.

Disposed circumferentially of the slug guard or member is a plurality of spray heads or nozzle constructions 234 in which water and compressed air are brought together, each of the spray heads being disposed in an opening 236 in the slug guard 199 as illustrated in FIGS. 12 and 13. The discharge ends 238 of the nozzles or spray heads are preferably flush with the inner peripheral surface 239 of the slug guard 199. Each of the spray heads or nozzle constructions 234 is supplied with water from the manifold 218 by a connecting pipe or tube 241, and each spray head is connected with the air manifold 226 by means of a tube or pipe 243.

The compressed air and water are discharged through the nozzles 238 of the spray heads 234, the air streams atomizing the water so that atomized particles of water are delivered into the fiberizing zone and onto the fibers. The heat from the fibers and the fiberizing environment rapidly vaporizes the water and cools the fibers so that the temperature of the fibers at the region of application of binder from the nozzles 212 onto the fibers at the lower end of the lapper member 205 is usually within a range of 175°F. to 300°F.

The size of the water particles and the amount of water delivered per unit of time onto the fibers may be controlled by adjusting the valves 224 and 232 to regulate the flow of water and compressed air to the manifolds 218 and 226. The delivery of water should be controlled so that the amount of water be substantially completely evaporated by heat from the fibers and fiberizing environment so that there is little or no residue of water on the cooled fibers. While treated water may be utilized for cooling the fibers, it has been found that deionized water is preferred to promote a minimum of sediment and fiber build-up on the lapper member 205.

FIG. 14 illustrates a rotary fiber forming unit 166' of the character shown in FIG. 11, the unit including a circular housing 168', a rotatable spinner 165' mounted by a quill 182', a stream 164' of molten glass flowing through the quill into the spinner 165'. Rotation of the spinner projected streams of the glass through orifices in the peripheral spinner wall into a gaseous attenuating blast delivered from a blower construction 190', the streams being attenuated to fibers 170'.

The fibers are cooled by the arrangement shown in FIGS. 12 and 13 mounted on the slug guard or circular member 199'. The spray heads or nozzle constructions 234' are circumferentially spaced on the slug guard 199' and extend through openings in the guard. A manifold 218' supplies water to the spray heads and the manifold 226' supplies compressed air to the spray heads. The water delivered from the spray heads or nozzles 234' by the compressed air is atomized to small particles projected onto the fibers to cool the fibers.

In this form a thin-walled inverted frusto-conically shaped member 245 surrounds the descending veil or tubular group of fibers 170', the member 245 being supported in a stationary position by suitable means (not shown). The lower terminus of the member 245 supports a circular manifold 247, the latter being equipped with a plurality of circumferentiallyspaced nozzles 249 which deliver binder composition from the manifold 247 onto the fibers 170'. A binder compositin from composition supply is delivered to the manifold 247 through a supply tube 250.

The region of application of the binder onto the fibers is spaced beneath the spinner a sufficient distance whereby the water delivered onto the fibers for cooling the fibers is substantially evaporated from the fibers before the binder is applied onto the cooled fibers. The fibers may be delivered onto a collecting conveyor such as the conveyor 174 but without transverse distribution or lapping of the group of fibers on the collector.

Successful operation of the method of the invention is dependent, in a measure, upon the amount of water delivered to the fiberizing zone and onto the fibers to cool the fibers and the size of the water particles. The amount of water should be controlled so that substantially all of the water is vaporized so that no water residue remains on the fibers at the region of application of the binder, but a maximum amount of water should be delivered onto the fibers to effectively cool the fibers without wetting the cooled fibers. The size of the particles of water or other vaporizable medium should be course enough to penetrate the veil of fibers, yet fine enough to be vaporized or evaporated from the fibers before the fibers reach the region of application of the binder.

It is apparent that, within the scope of the invention, modifications and different arrangements may be made other than as herein disclosed, and the present disclosure is illustrative merely, the invention comprehending all variations thereof.

We claim:

1. The method of forming fibers from heat-softened material including delivering heat-softened material onto a rotating body, projecting streams of the material from the rotating body by centrifugal forces, engaging a high velocity gaseous blast with the streams of material, attenuating the streams of material to fibers by the forces of the blast, entraining a vaporizable medium in gas streams independent of the gaseous blast, conveying the vaporizable medium in fine particle form by the gas streams onto the fibers at the attenuating region to cool the fibers, and applying binder onto the cooled fibers.

2. The method of forming fibers from heat-softened material including delivering heat-softened material onto a rotating body, projecting streams of the material from the rotating body by centrifugal forces, engaging a high velocity gaseous blast with the streams of material, attenuating the streams of material to fibers by the forces of the blast, applying a binder onto the fibers at a binder applying station spaced from the attenuating region, entraining a vaporizable medium in air streams independent of the gaseous blast, conveying the vaporizable medium in fine particle form by the air streams onto the fibers at the attenuating region in an amount as to be substantially completely vaporized by heat from the fibers to cool the fibers to a temperature substantially preventing volatilization of constituents of the binder without a residue of the medium remaining on the fibers at the region of application of the binder.

3. The method according to claim 2 wherein the vaporizable medium is water.

4. The method of forming fibers from heat-softened glass including delivering heat-softened glass into a rotating spinner, projecting streams of the glass from the rotating spinner by centrifugal forces, engaging a high velocity gaseous blast with the streams of glass, attenuating the streams to fibers by the forces of the blast, applying a binder onto the fibers at a binder applying station spaced from the attenuating region, entraining water in air streams independent of the gaseous blast for atomizing the water in fine particles, spraying the particles of water by the air streams onto the fibers at the attenuating region in an amount as to be substantially completely vaporized by heat from the fibers to cool the fibers to a temperature in advance of the application of binder onto the fibers substantially preventing volatilization of constituents of the binder at the binder applying station.

5. Apparatus of the character disclosed, in combination, a spinner, means for supplying heat-softened fiber-forming material to the spinner, means for rotating the spinner to project streams of the material from the spinner by centrifugal forces, means for delivering a high velocity gaseous blast into engagement with the streams for attenuating the material of the streams to fibers, a member embracing the fibers at the attenuation region, a plurality of spray heads mounted by the member, a first manifold connected with a supply of compressed air, a second manifold connected with a supply of water, means connecting the manifolds with the spray heads for conveying compressed air and water into the spray heads, said spray heads being adapted to deliver the water in fine particle form by the compressed air onto the fibers to cool the fibers, means for applying binder onto the cooled fibers at a region spaced from said member, the fibers being cooled by evaporation of the water by heat from the fibers to a temperature substantially preventing volatilization of the constituents of the binder at the region of binder application.

6. The combination according to claim 5 including means for regulating the delivery of compressed air to the spray heads, and means for regulating the delivery of water to the spray heads.

7. The combination according to claim 5 wherein the spray heads are disposed in circumferentially spaced openings in the member.

8. The combination according to claim 5 including an element embracing the attenuated fibers at a region spaced from the fiber attenuation region, the means for applying binder onto the fibers including binder delivery nozzles mounted by the element.

9. The combination according to claim 5 including a relatively movable tubular element through which the attenuated fibers are delivered, the binder applying means including a plurality of nozzles mounted by the tubular element, and means for oscillating the tubular element to effect distribution of the fibers.

* * * * *